W. L. HOWARD.
VEHICLE WHEEL.
APPLICATION FILED APR. 5, 1910.
991,311.
Patented May 2, 1911.
2 SHEETS—SHEET 1.
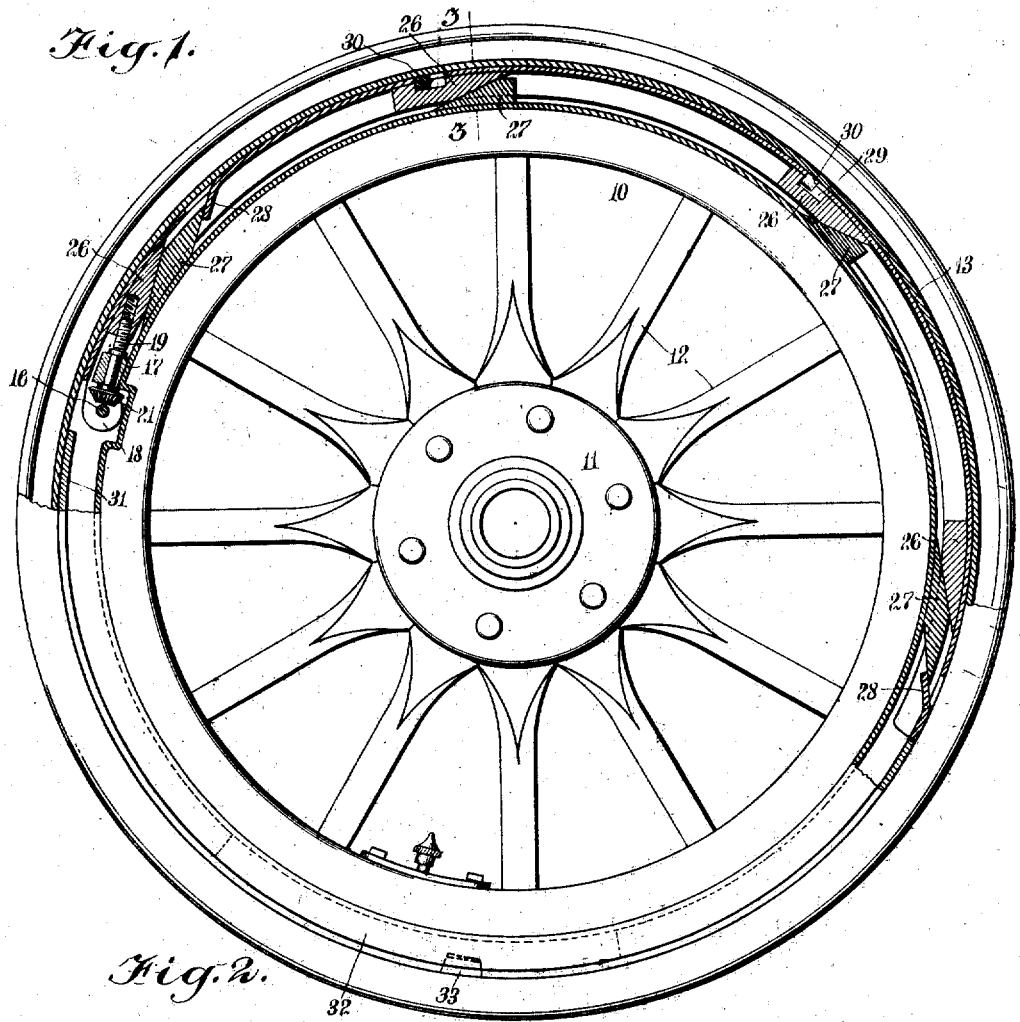
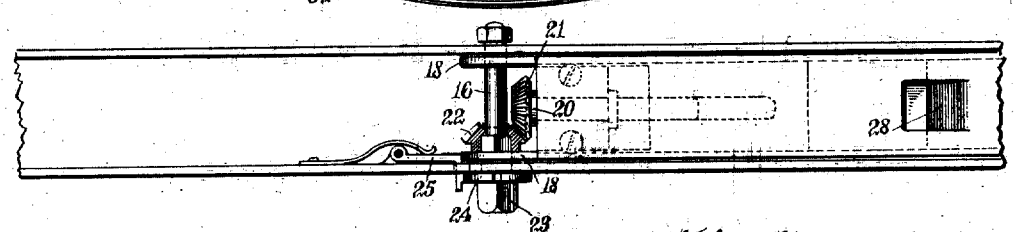
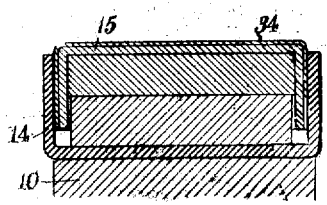
WITNESSES:
INVENTOR
William L. Howard
BY
ATTORNEYS

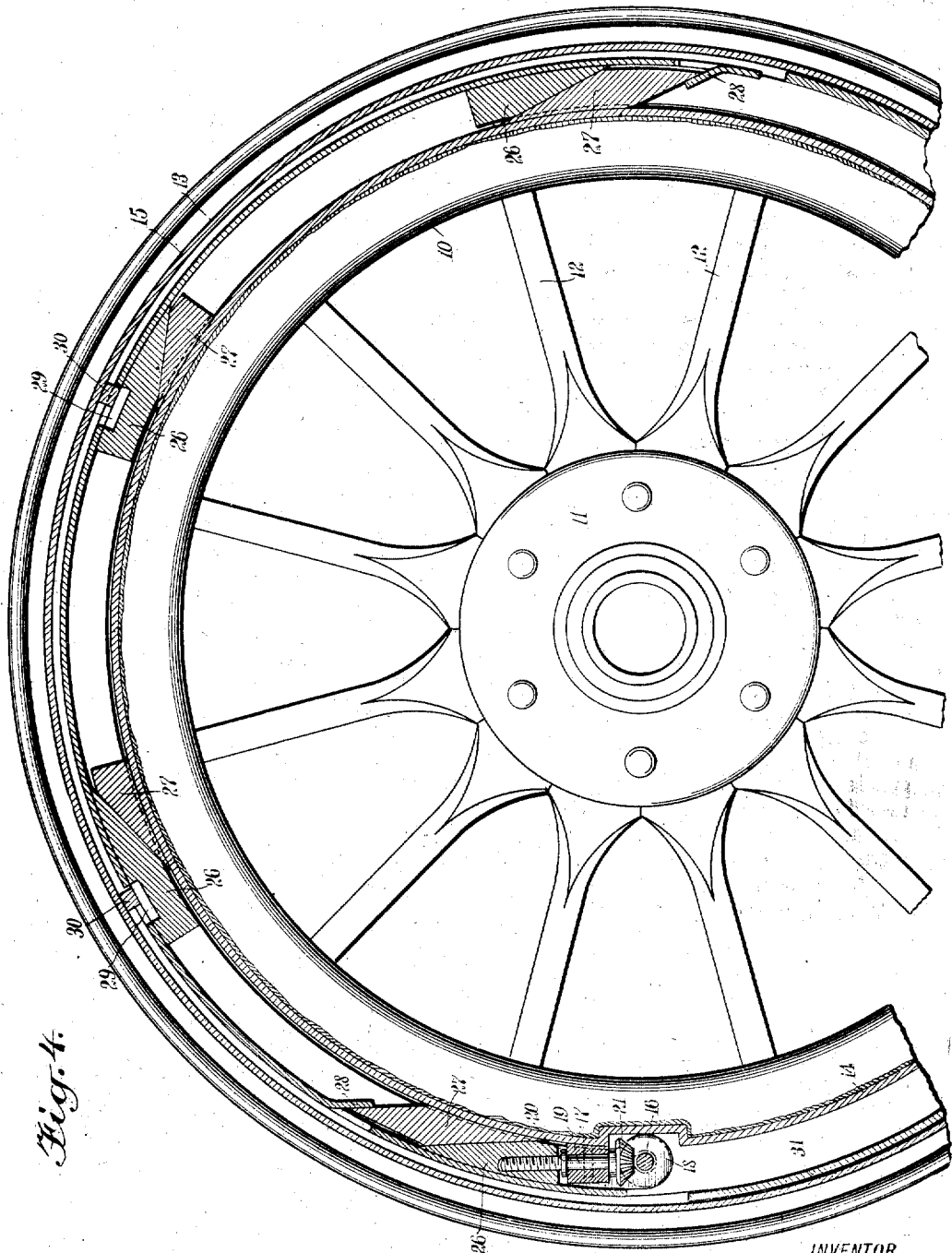

UNITED STATES PATENT OFFICE.

WILLIAM L. HOWARD, OF TRENTON, NEW JERSEY.

VEHICLE-WHEEL.

991,311.  Specification of Letters Patent. Patented May 2, 1911.

Application filed April 5, 1910. Serial No. 553,489.

*To all whom it may concern:*

Be it known that I, WILLIAM L. HOWARD, a citizen of the United States, and a resident of Trenton, in the county of Mercer and State of New Jersey, have invented a new and Improved Vehicle-Wheel, of which the following is a full, clear, and exact description.

This invention relates to certain improvements in vehicle wheels, and more particularly to a means employed for detachably securing the tire-carrying rim to the felly of the wheel.

My vehicle wheel operates upon the same general principle as the wheels disclosed in my prior Patents, Nos. 929,437 and 932,862, but involves certain improvements in the cams and the means for mounting, operating and controlling the same.

Reference is to be had to the accompanying drawings, forming a part of this specification, in which similar characters of reference indicate corresponding parts in all the figures, and in which—

Figure 1 is a side elevation of a wheel constructed in accordance with my invention, a portion thereof being shown in section; Fig. 2 is an edge view of a portion of the wheel, the rim thereof being removed; Fig. 3 is a transverse section on the line 3—3 of Fig. 1 and on an enlarged scale; and Fig. 4 is a view similar to a portion of Fig. 1, but showing the gripping section in released position.

In my improved wheel, I employ any suitable form of felly 10, connected to a hub 11 by any suitable form of spokes or connecting means 12. A rim 13 encircles the felly and is spaced therefrom, the said rim being of any suitable character, in the form illustrated being of a type commonly known as a "demountable rim," and adapted to carry a pneumatic or other form of resilient tire.

My invention relates to the means for detachably securing the rim to the felly, and in the form illustrated it includes two substantially channel-shaped members 14 and 15. The channel 14 has its web rigidly secured to the periphery of the felly and has its flanges extending outwardly therefrom in substantially parallel planes. The channel 15 has its web facing outwardly and its flanges extending inwardly toward the center of the wheel and in substantially parallel planes. The channel 15 is slightly narrower than the channel 14, so that the former may fit within the latter, as illustrated particularly in Fig. 3. The two channels are relatively movable both circumferentially and radially, and this movement operates to effect the gripping action. To move the channel member or gripping member 15, an operating mechanism is provided at one end thereof and a plurality of pairs of cams are mounted within the two channels, so as to coöperate and force the member 15 radially when the latter is moved longitudinally by the operating mechanism. The operating mechanism includes a bolt or shaft 16, extending transversely through the channel 14 and supported by the side flanges of the latter.

Within the channel 14 and also within the channel 15, is a bearing block 17, formed of two detachably connected sections, one of which has two wings or flanges 18, 18, through which the bolt passes, to prevent the longitudinal movement of the bearing block along the channels. A screw bolt 19 is mounted within this bearing block and is held against longitudinal movement in respect thereto by a collar 20 at one end of the bearing block, and a bevel pinion 21 at the opposite end. This bevel pinion 21 comes adjacent the bolt 16 and intermeshes with a bevel pinion 22 mounted on the latter, so that by rotating the bolt 16, the screw bolt 19 may also be rotated. The pinion 22 is held against rotation in respect to the shaft 16 in any suitable manner, as for instance, by a squared shoulder or bolt, and the bolt is preferably rotated by means of any suitable form of wrench or other tool, which may be applied to an outer squared head or end 23 at one end of the bolt and outside of the channel 14. For locking the bolt against rotation, a notched collar 24 may be mounted adjacent the head, and a spring-pressed catch 25 may engage within the notches of the collar. The outer end of the catch extends beyond the collar, so that the catch will be automatically forced to inoperative position when the wrench or other tool is applied to the square head 23. This locking mechanism is similar to that disclosed in my prior Patent No. 929,437, except that the catch coöperates with the edge of the collar opposite to the gripping member rather than against the outer radial edge. The screw bolt 19 is held against longitudinal movement as above specified, but the end of the bolt opposite to the bevel pinion 21 extends beyond the bearing block and has threaded engagement with the gripping member, so as to move the latter longitudinally upon the rotation of the screw bolt.

Brazed or otherwise rigidly secured to the inner surface of the web of the channel 15, are a plurality of blocks 26, each presenting a beveled or inclined under surface constituting a cam. For co-acting with these cam blocks, the outer surface of the web of the channel 14 is provided with a set of blocks 27, the outer surface of each of which is inclined or beveled to form a cam surface. These cams are so disposed in respect to each other, that by a longitudinal movement of the channel 15 in one direction, each cam 26 is caused to ride up on to its corresponding cam 27, so as to force the channel 15 outward radially. A longitudinal movement of the channel 15 in the opposite direction, permits the return radial movement of said channel. For insuring this return movement, certain of the cam blocks 27, for instance, the terminal ones, also have inclined or beveled under surfaces and the web of the channel 15 has tongues or flanges 28 struck inwardly therefrom and adapted to engage with these inclined under surfaces. As the channel member moves to bring the cam blocks 26 down off the cam blocks 27, the tongues 28 positively draw the channel 15 inwardly.

For insuring the positive gripping of the rim by the channel member or gripping member 15, the latter adjacent certain of the cam blocks 26, for instance the intermediate ones, may have bayonet slots 29 for receiving pins or studs 30 on the rim, substantially as disclosed in my prior patents above referred to. The gripping member or channel 15 extends around slightly more than one-half the circumference of the wheel, and the cams are so proportioned that all portions of the gripping member move outward radially to the same extent when said member is moved circumferentially. Along the remaining approximately one-half circumference of the wheel, the channel 14 is provided with an outer cover plate or wall 31, which may be brazed or otherwise rigidly secured to the outer edges of the flanges of said channel. This cover plate presents a surface for engagement with the inner surface of the rim and lies in an arc of the same circle as the web of the channel 15 when the latter is in extended position.

For counterbalancing the weight of the cam blocks 26 or 27, a block or weight 32 may be secured within the channel 14 diametrically opposite to the center of the gripping member. The plate 31 and the weight 32 may have an opening therein for the reception of a stud or projection 33 on the rim, which projection will insure the proper positioning of the rim and will prevent it from moving axially or circumferentially should the gripping member be left somewhat loose. The channels, cam blocks and other operating parts may be formed of any suitable material desired. As illustrated, the inner channel 15 is provided with an outer covering plate 34 of brass, which protects the channel against water which might rust it, and it also presents a good gripping surface for engagement with the inner surface of the rim.

Having thus described my invention, I claim as new and desire to secure by Letters Patent:

1. A vehicle wheel having a felly, a removable rim, and means for securing said rim to said felly, said means including two telescoping channel members, and means for moving one of said members circumferentially and radially in respect to the other and in respect to the rim.

2. A vehicle wheel having a felly, a removable rim, two telescoping channels between said felly and said rim, pairs of co-acting cams secured to the webs of said channels for moving one of said channels radially upon a circumferential movement thereof and means for preventing circumferential movement of the rim.

3. A vehicle wheel having a felly, a removable rim, and means for detachably securing said rim to said felly, said means including two telescoping channel members, one of which is movable radially and circumferentially in respect to the other to constitute a gripping member, pairs of co-acting cam blocks secured to the webs of said channels, and a tongue carried by the web of one channel for engagement with a cam block on the web of the other channel, for moving the gripping member inwardly upon its circumferential movement in one direction.

4. A vehicle wheel having a felly, a removable rim, and means for detachably securing said rim to said felly, said means including a channel member secured to said felly and having outwardly-extending flanges, a cover plate secured to said flanges along approximately one-half the length of the channel, and a second channel having inwardly-directed flanges fitting between the flanges of the first-mentioned channel and extending along approximately the remaining half of the length of the first-mentioned channel, means for moving said second-mentioned channel circumferentially, and means for moving said second-mentioned channel radially during the circumferential movement.

In testimony whereof I have signed my name to this specification in the presence of two subscribing witnesses.

WILLIAM L. HOWARD.

Witnesses:
CLAIR W. FAIRBANK,
PHILIP D. ROLLHAUS.